(12) United States Patent
Jackson

(10) Patent No.: US 11,709,682 B2
(45) Date of Patent: Jul. 25, 2023

(54) REPLICATING LOGIC BLOCKS TO ENABLE INCREASED THROUGHPUT WITH SEQUENTIAL ENABLING OF INPUT REGISTER BLOCKS

(71) Applicant: Imagination Technologies Limited, Kings Langley (GB)

(72) Inventor: Hugh Jackson, Sydney (AU)

(73) Assignee: Imagination Technologies Limited, Kings Langley (GB)

( * ) Notice: Subject to any disclaimer, the term of this patent is extended or adjusted under 35 U.S.C. 154(b) by 1046 days.

(21) Appl. No.: 14/745,880

(22) Filed: Jun. 22, 2015

(65) Prior Publication Data
US 2015/0370574 A1 Dec. 24, 2015

(30) Foreign Application Priority Data

Jun. 20, 2014 (GB) ...................................... 1411052

(51) Int. Cl.
*G06F 9/38* (2018.01)

(52) U.S. Cl.
CPC .................................. *G06F 9/3869* (2013.01)

(58) Field of Classification Search
CPC .................................. G06F 9/3869; H04J 3/00
See application file for complete search history.

(56) References Cited

U.S. PATENT DOCUMENTS

| 5,774,080 A | 6/1998 | Morley |
| 5,818,366 A | 10/1998 | Morley |
| 6,614,371 B2 * | 9/2003 | Zhang .............. H03K 3/356043 341/100 |
| 2005/0097620 A1 * | 5/2005 | Fye .................... H04N 5/44591 725/118 |
| 2005/0246510 A1 * | 11/2005 | Retnamma .......... G06F 11/1464 711/162 |
| 2006/0004992 A1 * | 1/2006 | Fujisawa ............... G06F 9/3885 712/226 |
| 2007/0104324 A1 | 5/2007 | Belnet et al. |

FOREIGN PATENT DOCUMENTS

CN 1885269 A 12/2006

OTHER PUBLICATIONS

Hennessy et al., "Computer Architecture—A Quantitative Approach", 2nd Edition, 1996, pp. 134.*

* cited by examiner

*Primary Examiner* — David J. Huisman
(74) *Attorney, Agent, or Firm* — Potomac Law Group, PLLC; Vincent M DeLuca

(57) ABSTRACT

A datapath pipeline which uses replicated logic blocks to increase the throughput of the pipeline is described. In an embodiment, the pipeline, or a part thereof, comprises a number of parallel logic paths each comprising the same logic. Input register stages at the start of each logic path are enabled in turn on successive clock cycles such that data is read into each logic path in turn and the logic in the different paths operates out of phase. The output of the logic paths is read into one or more output register stages and the logic paths are combined using a multiplexer which selects an output from one of the logic paths on any clock cycle. Various optimization techniques are described and in various examples, register retiming may also be used. In various examples, the datapath pipeline is within a processor.

11 Claims, 9 Drawing Sheets

REPLICATING LOGIC BLOCKS TO ENABLE INCREASED THROUGHPUT WITH SEQUENTIAL ENABLING OF INPUT REGISTER BLOCKS

BACKGROUND

It is generally desired to increase the throughput of data through a pipeline (e.g. an arithmetic logic unit) within a processor and typically this has been achieved by increasing the clock speed of the processor. However, clock speed is limited by the amount of logic between banks of registers within the pipeline as this logic must all be executed within one clock cycle. A known solution to this is to split combinational logic into multiple cycles and insert banks of registers in between each block of logic. As there is less logic between each register stage, the clock speed can be increased and the clock speed is now limited by the time taken to execute the slowest of the resultant logic blocks. The dividing of the combinational logic in this way enables the clock rate to be increased, which increases the throughput but also increases the latency (as extra clock cycles are required for data to pass through all the logic). In addition to manual design, a technique known as 'register retiming' may be used to determine how the logic is split and where the registers should be placed.

The embodiments described below are not limited to implementations which solve any or all of the disadvantages of known methods of designing pipelines within a processor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A datapath pipeline which uses replicated logic blocks to increase the throughput of the pipeline is described. In an embodiment, the pipeline, or a part thereof, comprises a number of parallel logic paths each comprising the same logic. Input register stages at the start of each logic path are enabled in turn on successive clock cycles such that data is read into each logic path in turn and the logic in the different paths operates out of phase. The output of the logic paths is read into one or more output register stages and the logic paths are combined using a multiplexer which selects an output from one of the logic paths on any clock cycle. Various optimization techniques are described and in various examples, register retiming may also be used. In various examples, the datapath pipeline is within a processor.

A first aspect provides a datapath pipeline comprising: one or more replicated blocks of logic forming parallel logic paths within the pipeline; an input register block at a start of each logic path, wherein in any clock cycle data only a subset of the input register stages are enabled; one or more output register blocks arranged to receive data from one or more of the logic paths; and a multiplexer arranged to recombine the parallel logic paths into a single output.

A second aspect provides a method of operating a datapath pipeline, the method comprising: enabling each of a set of input register blocks in turn on successive clock cycles to pass data into a plurality of parallel logic paths; processing the data in each logic path over a plurality of clock cycles; and selecting an output from each logic path in turn on successive clock cycles.

A third aspect provides a method of designing a datapath pipeline, the pipeline comprising logic and the method comprising: replicating at least a part of the logic to form multiple logic paths; adding an input register block to a start of each logic path; adding an output register block to an end of each logic path; configuring the pipeline to enable the input register blocks in sequence on successive clock cycles; configuring the pipeline to enable the output register blocks in sequence on successive clock cycles; and adding a multiplexer to combine outputs from the logic paths.

Further aspects provide a computer readable storage medium having encoded thereon computer readable program code for generating a processor comprising the pipeline described above and a computer readable storage medium having encoded thereon computer readable program code for generating a processor configured to perform the method described above.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software embodied on a non-transitory computer readable medium, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
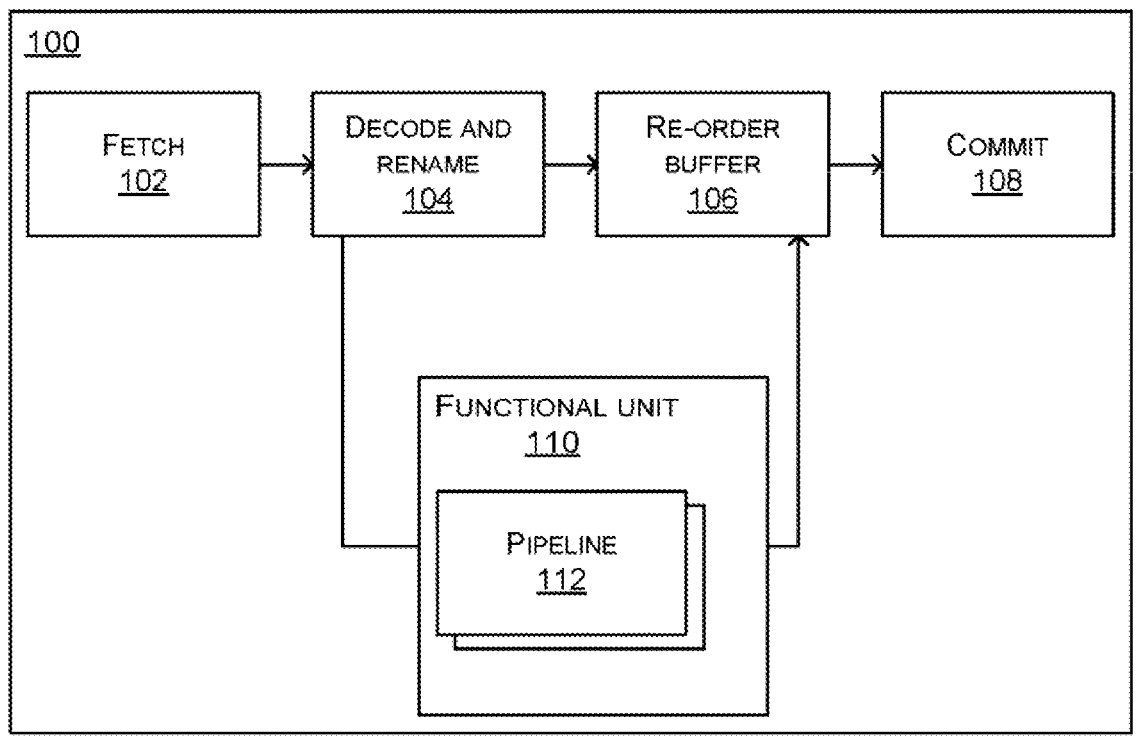
FIG. 1 shows a schematic diagram of example processors in which the methods described herein may be implemented.
Figure 1:
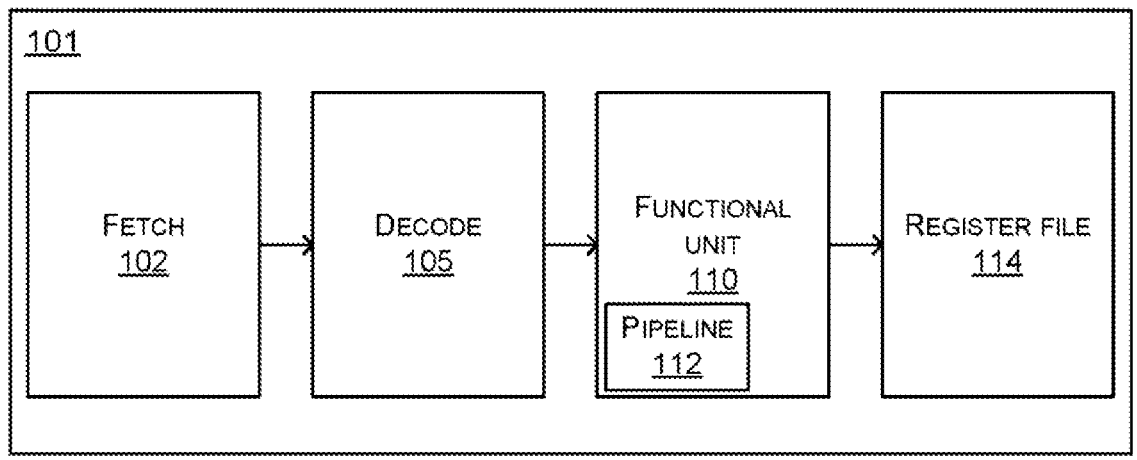

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, by adding extra register stages within a pipeline, there is less logic between each register stage and the clock speed can be increased. However, as the logic between stages is decreased, the set up and hold time of the registers becomes a more significant contribution to the delay between register stages and this is one of the factors that limit the ability to increase the clock speed further (as the delay corresponds to the minimum possible clock period). Furthermore, the addition of extra register stages can have an adverse effect on the size of a design (where registers are placed in the middle of the logic, they are typically required to store more bits than at either the input or output of the logic) and also the active power of that design (due to the large number of registers clocking ever cycle the hardware is in use).

A datapath pipeline and methods of designing and operating a datapath pipeline are described herein which enable the clock speed to be increased and hence the throughput of the pipeline may be increased. As described below, these methods may, in various examples, be used in combination with register retiming (or other conventional pipelining techniques) or the methods may be used independently of register retiming. In the methods described herein, the combinational logic is replicated and the replicated versions are run in parallel but out of phase. This reduces the effective clock speed (or effective clock rate) within each of the replicated blocks (e.g. data may only be clocked into a replicated block on alternate clock cycles such that the block may have two clock cycles in which to complete). By reducing the number of register stages, compared to standard solutions, the total set up and hold time is reduced which enables the actual clock speed to be increased. As described in more detail below, further improvements in clock speed and/or device area may be achieved by optimizing which parts of the logic are replicated and the position of the output multiplexers (which combine the results from the replicated blocks back into a single path) and output registers. In many examples, the methods described herein are implemented for combinational logic that does not include any combinatorial feedback (i.e. the logic block does not feedback into itself). In other examples, however, feedback may be included.

The term 'datapath pipeline' (which may also be referred to as an 'execution pipeline' or 'pipeline') refers to a block of logic that takes multiple clock cycles for information to be processed and consequently often comprises multiple register stages with logic in between the register stages. In various examples, the pipeline may be part of a processor (as in the examples described below), e.g. part of a central processing unit (CPU), graphics processing unit (GPU) or digital signal processor (DSP); however the methods described herein may also be implemented elsewhere.

The term 'combinational logic' refers to logic where the output is a pure function of the present input only and the output does not depend on the history of the input (unlike sequential logic). A pipeline may comprise combinational and sequential logic and the part of an arithmetic logic unit (ALU) that does mathematical calculations may comprise only combinational logic. Combinational logic may also be referred to as time-independent logic or combinatorial logic.

FIG. 1 shows a schematic diagram of two example processors 100, 101 in which the methods described herein may be implemented. The first example processor 100 is an out-of-order processor and the second example processor 101 is an in-order processor. In this example the processors 100, 101 are single-threaded processors, however the methods are also applicable to multi-threaded processors. Furthermore, as described above, although the pipelines 112 are shown as part of the example processors 100, 101, the methods and pipelines described herein are not limited to pipelines within a processor (e.g. within a CPU).

The out-of-order processor 100 comprises a fetch stage 102, a decode and rename stage 104, a re-order buffer 106, a commit stage 108 and one or more functional units 110 which each comprise one or more execution pipelines 112.

The fetch stage 102 is configured to fetch instructions from a program (in program order) as indicated by a program counter (PC). Once an instruction is fetched it is provided to the decode and rename stage 104 which is arranged to interpret the instructions and perform register renaming.

After an instruction passes through the decode and rename stage 104 it is inserted into a reorder buffer 106 (ROB) and dispatched to a functional unit 110 for execution. The functional unit 110 that the instruction is dispatched to may be based on the type of instruction. The re-order buffer 106 is a buffer that enables the instructions to be executed out-of-order, but committed in-order. The re-order buffer 106 holds the instructions that are inserted into it in program order, but the instructions within the ROB 106 can be executed out of sequence by the functional units 110.

Each functional unit 110 is responsible for executing instructions and may be configured to execute specific types of instructions. The functional units 110 may comprise one or more of a load-store unit, an integer unit, a floating point unit (FPU), a digital signal processing (DSP)/single instruction multiple data (SIMD) unit, or a multiply accumulate (MAC) unit. The pipelines 112 within the functional units may have different lengths and/or complexities. For example, a FPU pipeline is typically longer than an integer execution pipeline because it is generally performing more complicated operations.

The in-order processor 101 comprises a fetch stage 102, a decode stage 105, one or more functional units 110 (which each comprise one or more execution pipelines 112) and a register file 114. Like the decode and rename stage 104 in out-of order processor 100, the decode stage 105 in an in-order processor is arranged to interpret the instructions fetched in the fetch stage 102; however in an in-order processor, the decode stage 105 does not perform register renaming.

It will be appreciated that other processors may not comprise all the functional elements shown in FIG. 1 (i.e.

one or more of the functional elements shown in FIG. 1 may be omitted) and may, in some examples, comprise additional functional elements not shown in FIG. 1.

Figure 2:
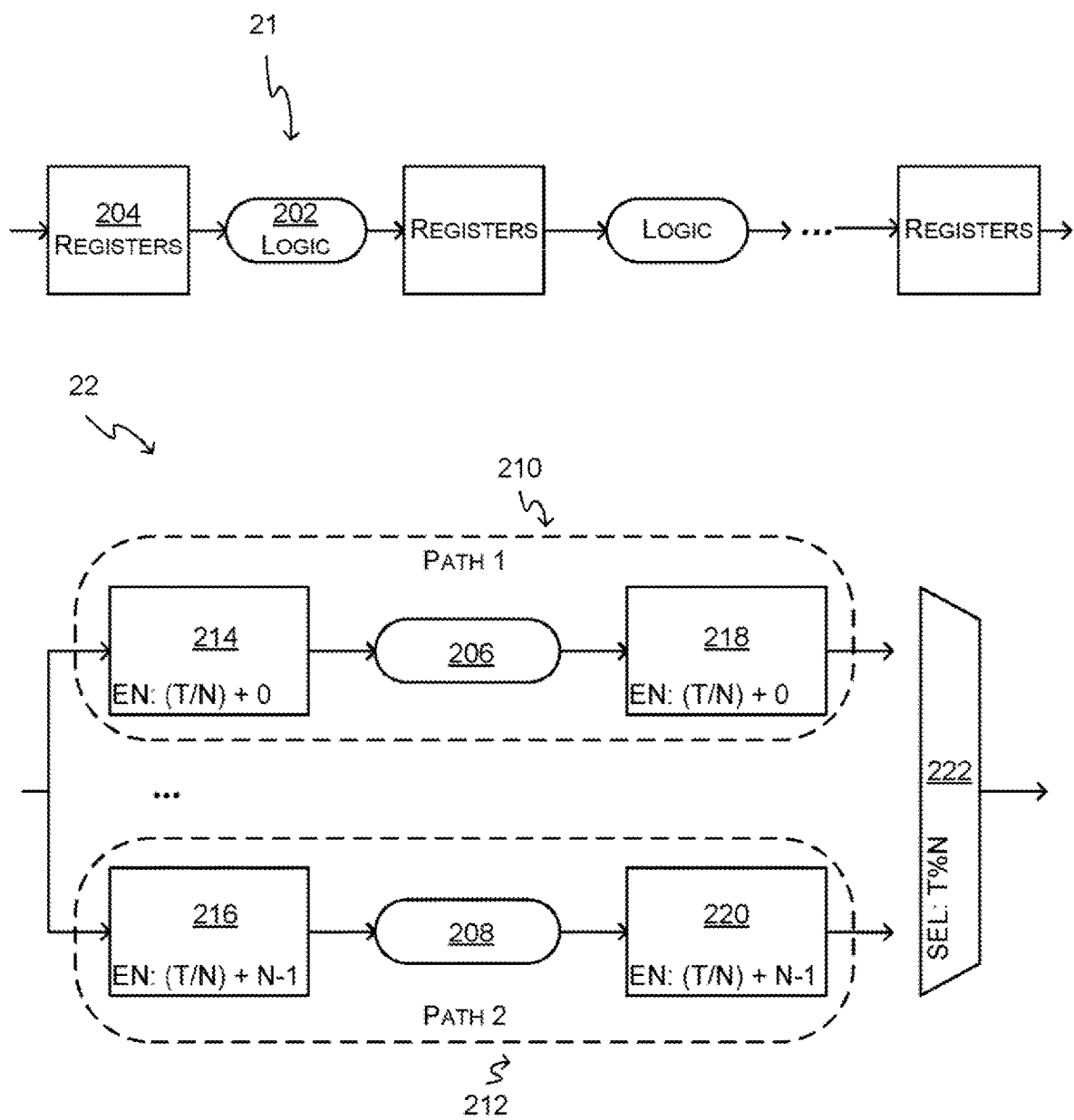
FIG. 2 shows two schematic diagrams of execution pipelines.

FIG. 2 shows schematic diagrams of execution pipelines 21, 22. Each pipeline 21, 22 comprises blocks of combinational logic 202 (which will be referred to as 'logic' in the following description) represented by round ended shapes and register blocks 204 represented by squares. The first pipeline 21 is a standard pipeline comprising three register stages (each comprising a register block 204) with blocks of logic 202 in between them. There is a register stage at the input to the pipeline 21, which may be referred to as the input register stage, and there is a register stage at the output of the pipeline 21, which may be referred to as the output register stage.

The second pipeline 22 is a first example of an improved pipeline (where, as described above, the term 'pipeline' refers to any block of logic that takes multiple cycles for information to be processed). As can be seen from the diagram, a block of logic has been formed which corresponds to the two logic blocks 202 of pipeline 21 and then this block of logic (which takes two cycles to complete) has been replicated, creating two identical blocks of logic 206, 208 and two logic paths, Path 1 210 and Path 2 212. Each path 210, 212 comprises an input register stage (register blocks 214, 216) and an output register stage (register blocks 218, 220) and the two paths 210, 212 are combined following the output register stages 218, 220 using a multiplexer 222.

Figure 3:
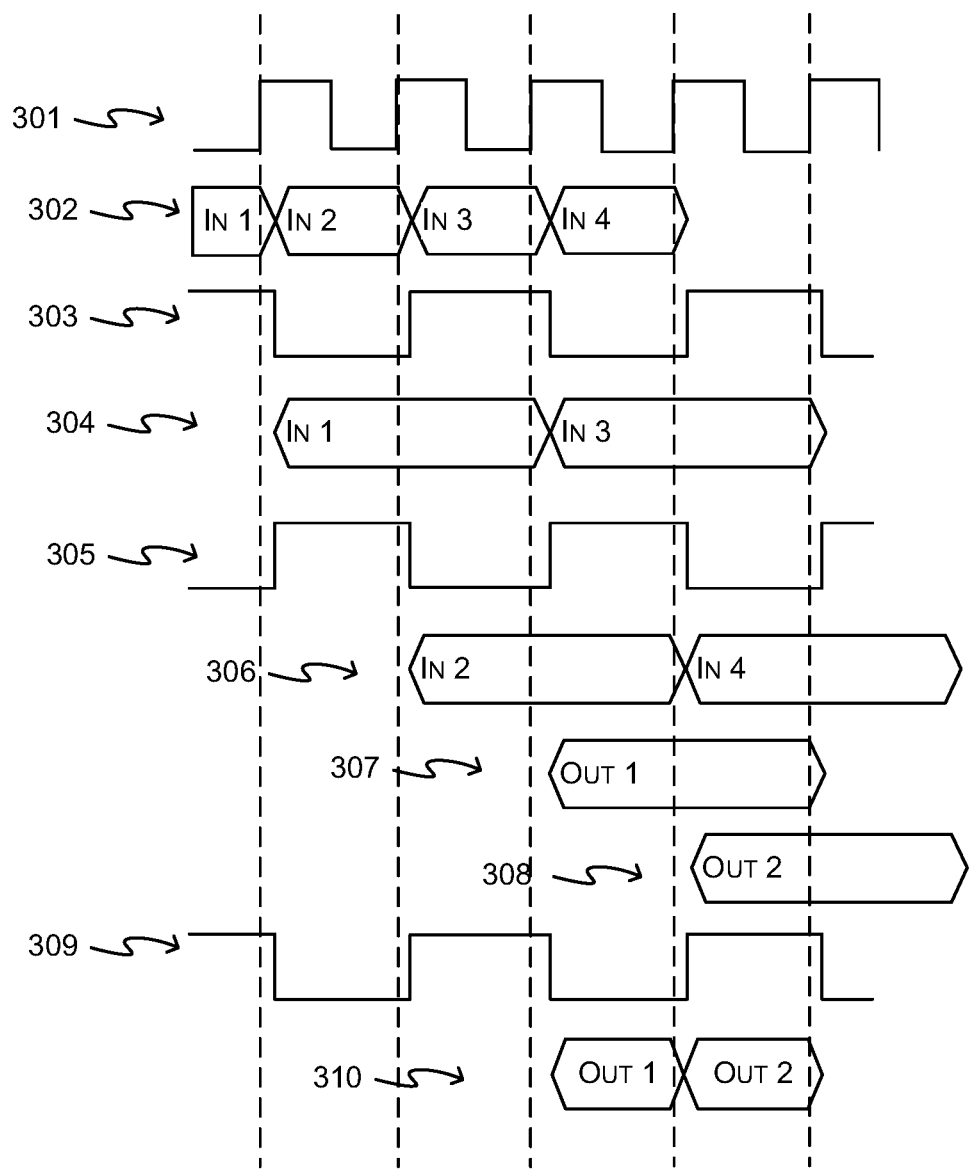
FIG. 3 shows waveforms for an improved execution pipeline shown in FIG. 2.

The operation of the pipeline 22 can be described with reference to the diagram shown in FIG. 3. Each of the input register blocks 214, 216 are enabled (i.e. clocked) on alternate clock cycles (as shown by waveforms 303 and 305) such that they receive new data on alternate clock cycles and then hold that data for two clock cycles (as shown by waveforms 304 and 306, with the shared input data shown in waveform 302). For example, the first input register block 214 stores input data 1 on clock edge 0 (see waveform 304). On clock edge 1, the second input register block 216 stores input data 2 (see waveform 306) and the first input register block is still holding input data 1 (see waveform 304). On clock edge 2, the first input register block 214 stores input data 3 (see waveform 304) while the second input register block is still holding input data 2 (as shown in waveform 306). On clock edge 3, the second input register block 216 stores input data 4 (see waveform 306) and the first input register block is still holding input data 3 (as shown in waveform 304), and so on. Input register block 214 therefore holds input data 1 for clock cycles 0 and 1 (as shown in waveform 304), input register block 216 holds input data 2 for clock cycles 1 and 2 (as shown in waveform 306), etc. This is represented in FIG. 2 by the enable (EN) logic, with EN: (T/N)+0 for the first input register block 214 and EN: (T/N)+N−1 for the second input register block 216, where T is the current cycle count (i.e. the time) and N is the number of stages in the pipeline (N=2 in the example shown).

The clocks used for the input (and output) register blocks may be separate from the main clock (i.e. the normal clock for the pipeline); however, in many examples the same clock (represented by waveform 301 in FIG. 3) may be used to clock all the register stages, with the clock passing through a clock gating cell such that registers are not enabled on every cycle of the main clock (as shown by waveforms 303 and 305).

The replicated blocks of logic 206, 208 therefore have two clock cycles to complete, during which time the input data (in the input register stage) is held (as shown in waveforms 304 and 306). Referring back to the previous example, the first replicated block of logic 206 processes input data 1 in the clock cycles between clock edges 0 and 2, the second replicated block of logic 208 processes input data 2 in the clock cycles between clock edges 1 and 3, the first replicated block of logic 206 processes input data 3 in the clock cycles between clock edges 2 and 4, etc. Consequently, the "effective clock rate" of each path 210, 212 may be considered to be half the actual clock rate (i.e. the clock rate of pipeline 21).

In a similar manner to the input register blocks 214, 216, each of the output register blocks 218, 220 is enabled on alternate clock cycles (as shown by waveforms 303, 305) such that they receive new data on alternate clock cycles. On clock edge 2 the first output register block 218 receives the results of the first replicated block of logic 206 processing input data 1 (which occurs in the two previous clock cycles). This data is then held on the output of register block 218 for two clock cycles (as shown in waveform 307). On clock edge 3 the second output register block 220 receives the results of the second replicated block of logic 208 processing input data 2 (which occurs in the two previous clock cycles) and this data is then held on the output of register block 220 for two clock cycles (as shown by waveform 308), etc.

The output multiplexer 222, which combines the outputs of the two independent logic paths 210, 220 within the pipeline 22, selects alternate inputs on adjacent clock cycles. FIG. 2 shows the selection logic (SEL:T % N, where the symbol '%' means 'modulo') and this is shown in waveform 309 in FIG. 3, with a '0' indicating selection of path 1 210 and a '1' indicating selection of path 2 212. It can be seen from FIG. 3 that the multiplexer 222 selects the register bank (or output register block 218, 220) which has just been updated (as shown in waveform 310), e.g. it selects the first path 210 in on clock edge 2, the second path 212 on clock edge 3, the first path 210 on clock edge 4, etc. It can also be seen from FIG. 3. that, the register blocks 218, 220 are only required to hold the data for the first cycle but equally have no new data to clock in so clocking every cycle would waste power.

Although FIG. 2 only shows two replicated blocks 206, 208 forming two logic paths 210, 212 the method may be extended to N replicated blocks forming N logic paths. In such an example, each input and each output register stage is enabled every $N^{th}$ clock cycle with one input stage and one output stage being enabled in every clock cycle. This means that each of the N replicated blocks has N clock cycles in which to process the input data and the multiplexer selects one of the N paths in each clock cycle and cycles through selection of each of the N paths in turn.

The first example of an improved pipeline 22 shown in FIG. 2 comprises an increased amount of logic which results in increased size (e.g. area) of logic compared to the first pipeline 21; however, by reducing the number of register stages in any path (and therefore removing the associated setup and hold times), it enables the clock speed to be increased which increases the throughput of the pipeline. Although there are now more register blocks (4 instead of 3), each register block in pipeline 22 will have equal or smaller widths compared to the register blocks in 21 as the registers are only at the input and output and not in the middle of the path, where data widths are likely to be larger than at the input. Additionally, as the registers are clocked less (e.g. every $N^{th}$ cycle for the input registers) the active (or dynamic) power consumption of the register blocks is reduced and the active power consumption of the logic remains approximately the same (as new data is only clocked into the logic every N cycles). There is an effect on the overall leakage power, but the increase due to the additional logic is offset by the reduction due to the reduced number of registers.

Depending on the specific design, leakage power may vary between the two pipelines shown in FIG. 2.

The technique of replicating logic to create multiple independent logic paths, as shown in the first example of an improved pipeline 22 in FIG. 2 may be referred to as 'sidelining'. Further optimizations of this technique are described below and as described above, the technique may also be combined with register retiming or other forms of pipelining.

Figure 4:
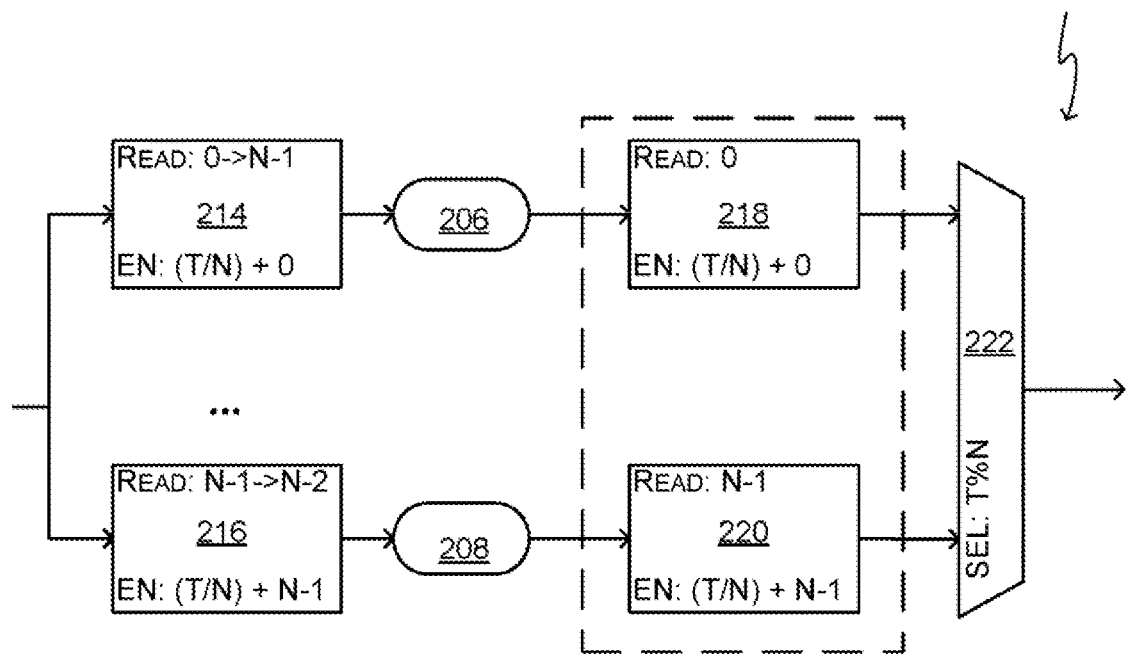
FIG. 4 shows a further optimization which may be made to the improved pipeline shown in FIG. 2.
Figure 4:
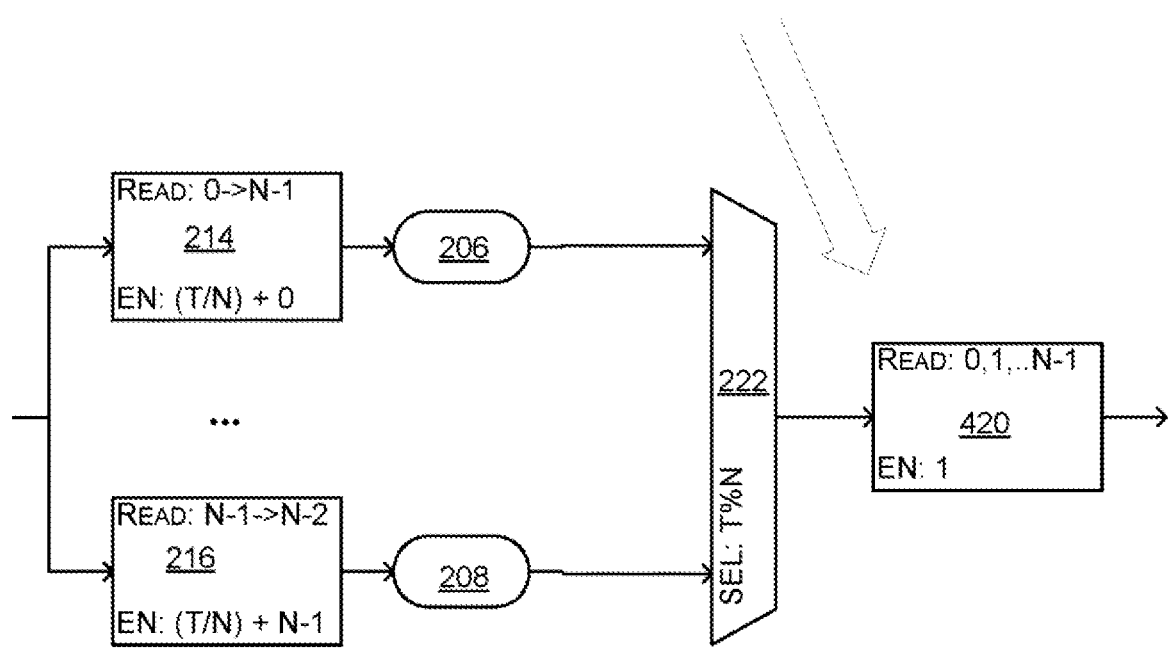

FIG. 4 shows a further optimization which may be made to the improved pipeline 22 shown in FIG. 2 and described above. The improvement shown in FIG. 4 relates to the positioning of the multiplexers and output register stage(s).

FIG. 4 shows the first example improved pipeline 22 from FIG. 2 and a second example improved pipeline 42 which has a reduced number of register blocks, although the number of register stages remains the same (e.g. pipeline 22 has four register blocks 214, 216, 218, 220 in two register stages, whereas pipeline 42 has three register blocks 214, 216, 420 in two register stages). As described above, the output register blocks 218, 220 in pipeline 22 are enabled on alternate cycles and in any clock cycle data is only being read from one of the pair of output register blocks (e.g. output register block 218 is read in clock cycle 0, 2, etc. and output register block 220 is read in clock cycle 1, 3, etc.). Consequently, the pipeline can be optimized by moving the output register blocks beyond the multiplexer 222 and replacing them by a single output register block 420 which is enabled on all clock cycles, receiving data from the two logic paths alternately, and from which data is read on every cycle.

It will be appreciated that although FIG. 4 shows two logic paths the method may be extended to N replicated blocks forming N logic paths. In such an example, each input register stage is enabled every $N^{th}$ clock cycle with one input register stage being enabled in every clock cycle. This means that each of the N replicated blocks has N clock cycles in which to process the input data and the multiplexer selects one of the N paths in each clock cycle and cycles through selection of each of the N paths in turn. The single output register block 420 in pipeline 42 is enabled on all clock cycles.

The second example improved pipeline 42 reduces the area required for registers compared to the first improved pipeline 22 and hence reduces the static (or leakage) power consumption while the dynamic power consumption remains approximately the same.

Compared to a traditionally pipelined solution (e.g. as shown by pipeline 21), there are the same overall number of register blocks in the second example improved pipeline 42; however each path comprises fewer register stages, thereby reducing the total set up and hold time. Furthermore, as the register stages are only at the input and output, they are less wide (i.e. they need to store a smaller number of bits) and as a result of the parallel paths, the register stages are clocked less (the register stages in pipeline 21 are all clocked each clock cycle, whereas the input register stages in pipeline 42 are only clocked alternate cycles). This reduces the dynamic power consumption compared to pipeline 21.

Figure 5:
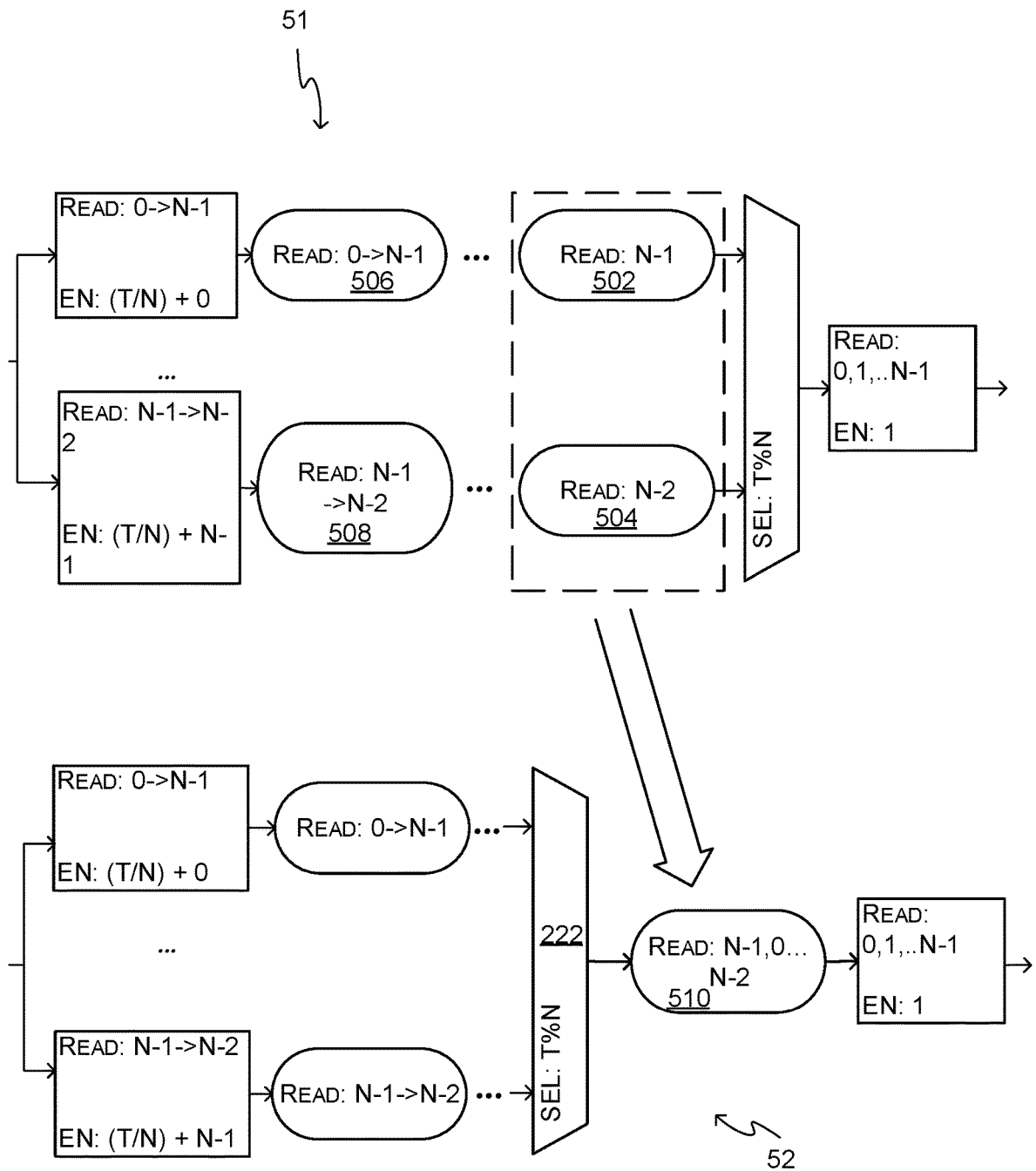
FIG. 5 shows a further optimization which may be made to a pipeline.

FIG. 5 shows a further optimization which may be made to a pipeline 51 (which may correspond to the improved pipeline 42 shown in FIG. 4) where there is a block of identical logic 502, 504 at the end of each replicated logic block (and hence at the end of each logic path) from which data is only required to be stable for 1 cycle on alternate clock cycles. In various examples, the known algorithms which are used for register retiming may be used to optimize the position of the multiplexers where sidelining is used. An example algorithm is that proposed by C. E. Leiserson and J. B. Saxe in "Retiming Synchronous Circuitry" published in Algorithmica, 1991. Other example algorithms are network flow algorithms and a mixed-integer linear program algorithm.

Referring back to the improved pipeline 42, the replicated logic block 206, 208 may be divided into two or more smaller logic blocks 502-508 as shown in FIG. 5 (without register stages between logic blocks as would be the case if traditional pipelining was used). In the example shown in pipeline 51, the first of the smaller logic blocks 506, 508 in each path is required to be stable for 2 clock cycles (e.g. if N=2, block 506 is kept stable on cycles 0→1 and block 508 is kept stable on cycles 1→0), whereas the last of the smaller logic blocks 502, 504 in each path is only required to be stable for 1 cycle on alternate cycles (e.g. if N=2, block 502 is kept stable on cycle 1 and block 504 is kept stable on cycle 0).

As shown in the improved pipeline 52, the two logic blocks 502, 504 prior to the multiplexer 222, which are each only required to be stable for 1 cycle on alternate clock cycles, may instead be replaced by a single logic block 510 after the multiplexer 222. This reduces the amount of logic which is replicated and hence the area (e.g. of silicon) which is required to fabricate the pipeline, whilst still enabling the clock speed (and hence throughput) to be increased. As the multiplexer 222 is now within the logic chain (i.e. it has logic blocks on both its input and its output), rather than being after all the logic, this may increase the width of the data which the multiplexer must be able to accommodate; however, as the logic required to implement a multiplexer is relatively simple, this does not result in a large increase in the required area.

The multiplexer 222 at the output does not add many logic levels (e.g. it can be implemented as a single level of AND-OR) and the extra area the multiplexer represents is offset by the reduction in the area occupied by registers (as overall there are less bits being stored in registers as the registers are only at the input and output and not in the middle of the path, where data widths are likely to be larger than at the input).

As with FIGS. 2 and 4, it will be appreciated that while FIG. 5 shows two logic paths to simplify explanation, the method may be extended to N logic paths. In such an example, where there is logic at the end of each path which is only required to be stable for every $N^{th}$ clock cycle, this logic may be replaced by a single instance of the logic after the multiplexer.

Figure 6:
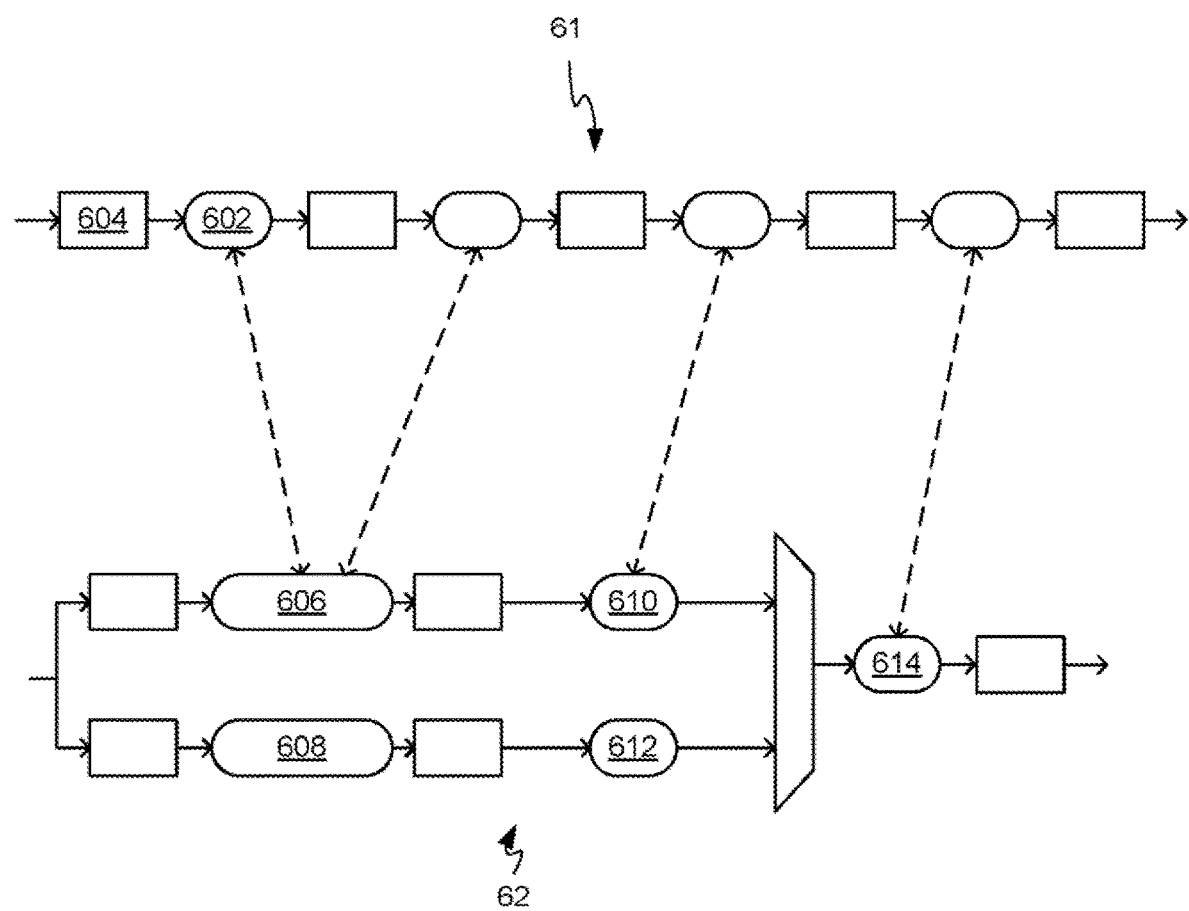
FIG. 6 shows a comparison of a fully pipelined functional unit and a functional unit that uses a combination of pipelining and sidelining.

FIG. 6 shows a comparison of a fully pipelined functional unit (as can be created manually or by using register retiming techniques) 61 and a functional unit 62 that uses a combination of pipelining and sidelining. The term functional unit' is being used instead of pipeline when describing FIG. 6 for reasons of clarity and it will be appreciated that the functional units shown may be a full functional unit or part thereof.

In the fully pipelined functional unit 61, blocks of logic 602 which each can be executed in a single cycle are separated by register stages 604. In the functional unit 62 which uses both pipelining and sidelining, some of the logic has been replicated (e.g. blocks 606 and 608 and blocks 610 and 612) to form two independent paths and others have not (e.g. block 614). Dotted arrows between the two pipelines 61, 62 show the correspondence between logic blocks and it can be seen that one of the replicated logic blocks 606, 608 in the second pipeline 62 comprises logic which takes two cycles to execute. As described above, data is clocked into each of the two paths on alternate clock cycles such that the effective clock rate in either path is half the actual clock rate. Also the structure containing logic blocks 610, 612 and 614 shows an optimization described in reference to FIG. 5.

By combining the pipelining and sidelining techniques as shown in the lower diagram in FIG. 6, the resultant functional unit has an increased clock speed (as a result of sidelining) whilst reducing the overall logic area (as a result of pipelining).

Although the second diagram in FIG. 6 shows two logic blocks being replicated to form two parallel, independent logic paths, the method may be extended to involve further replication to form N logic paths. Furthermore, as also shown in FIG. 6, the methods described herein may be used to replicate logic blocks in only a part of the functional unit.

Figure 7:
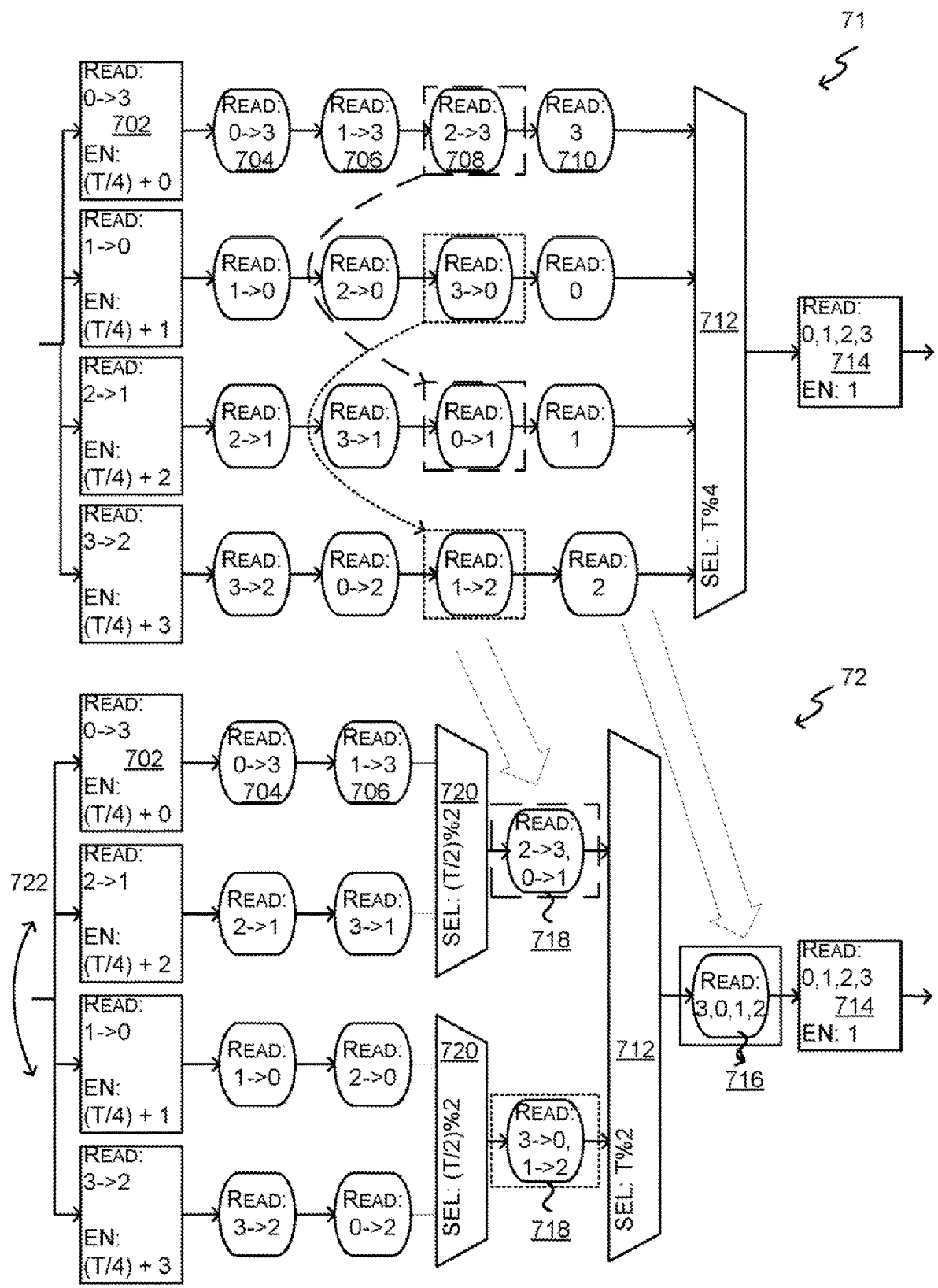
FIG. 7 shows two further improved pipelines.

FIG. 7 shows two further improved pipelines 71, 72 in which N=4. Although the second pipeline 72 may be considered an optimization of the first pipeline 71, each may be the appropriate solution depending upon the particular requirements and application for the pipeline. In particular, although the second pipeline 72 has less duplication of logic, it has two additional multiplexers and the size of these multiplexers (i.e. the number of bits that are accommodated by the multiplexer) will depend on the particular calculations being performed by the pipeline and in some examples may be very large (e.g. if the pipeline is multiplying 32 bit numbers together, there may be 64 or 128 bits in the middle of the logic path). Consequently, depending upon the particular application, pipeline 71 may occupy more or less area (e.g. on a silicon chip) than pipeline 72.

The first pipeline 71 shown in FIG. 7 is somewhat similar to pipelines 42 and 51 shown in FIGS. 4 and 5 and described above, except that N=4 (N=2 for pipelines 42 and 51). The pipeline 71 comprises four independent logic paths each comprising an input register block 702 and some logic which is identical in each path. Each input register block 702 is enabled every $N^{th}$ (i.e. $4^{th}$) clock cycle and holds the data for N (i.e. 4) cycles. The values held by the input register block 702 (and the input register blocks in all the improved pipelines described herein) does not change except when the input register stage is enabled. Even though the logic path may take N cycles to execute, the input registers must hold the data for the N cycles (and not, for example, read in new data for processing), otherwise this may affect the output of the logic path. There is a single output register block 714 which is placed after the multiplexer 712 (e.g. in a similar manner to pipeline 42 shown in FIG. 4).

Although the logic in each path can be represented as one single block (as in blocks 206, 208 in pipeline 42), in FIG. 7 the logic in a logic path is represented as four discrete blocks (which are not separated by register stages) and each block is labeled to identify on which cycles data is required to be stable, where the cycles are numbered 0 to 3 and then repeat (e.g. cycle 4=cycle 0, cycle 5=cycle 1, etc.). In each path the first logic block 704 is required to be stable for all four cycles, the second logic block 706 is required to be stable for 3 of every 4 cycles (e.g. cycles 1-3 for the first path), the third logic block 708 is required to be stable for 2 of every 4 cycles (e.g. cycles 2-3 for the first path) and the fourth logic block 710 is required to be stable for 1 of every 4 cycles (e.g. cycle 3 for the first path).

The second pipeline 72 shown in FIG. 7 applies the optimization described above with reference to FIG. 5 to the first pipeline 71. Considering first the fourth logic blocks 710 in each of the logic paths in pipeline 71, it can be seen that there is no overlap when data is required to be stable between the paths and so the four logic blocks 710 can be replaced by a single logic block 716 after the multiplexer 712. Considering the third logic blocks 708 in each of the logic paths in pipeline 71, it can be seen that there is no overlap in when data is required to be stable between the first and third paths and similarly no overlap in when data is required to be stable between the second and fourth paths. Consequently, the four third logic blocks 708 can be replaced by two logic blocks 718 which are each shared between two logic paths which are combined using a multiplexer 720 which alternately selects one of the two paths. It should be noted that the paths in pipeline 72 are drawn in a different order to pipeline 71, with the second logic path in pipeline 72 corresponding to the third path in pipeline 71 and the third logic path in pipeline 72 corresponding to the second path in pipeline 71, as indicated by arrow 722.

As with FIGS. 2, 4 and 5, it will be appreciated that while FIG. 7 shows four logic paths for purposes of explanation, the method may be extended to N logic paths. In such an example, pairs of logic paths may be combined together using multiplexers and fed into one of N/2 logic blocks, with the outputs of the N/2 logic blocks being combined by a further multiplexer and fed into an output logic block before the output register stage.

It will be appreciated that the improved pipelines 22, 42, 51, 52, 62, 71, 72 provide just some examples of improved pipelines and have been described to demonstrate the technique of sidelining which may be used to increase the clock speed, and hence throughput, of a pipeline. As described above and shown in FIG. 6, sidelining may be used in combination with traditional pipelining or sidelining may be used independently of traditional pipelining. In various examples, the algorithms used in register retiming to determine the optimum position for a register stage may be used in sidelining to determine the optimum position for a multiplexer.

Figure 8:
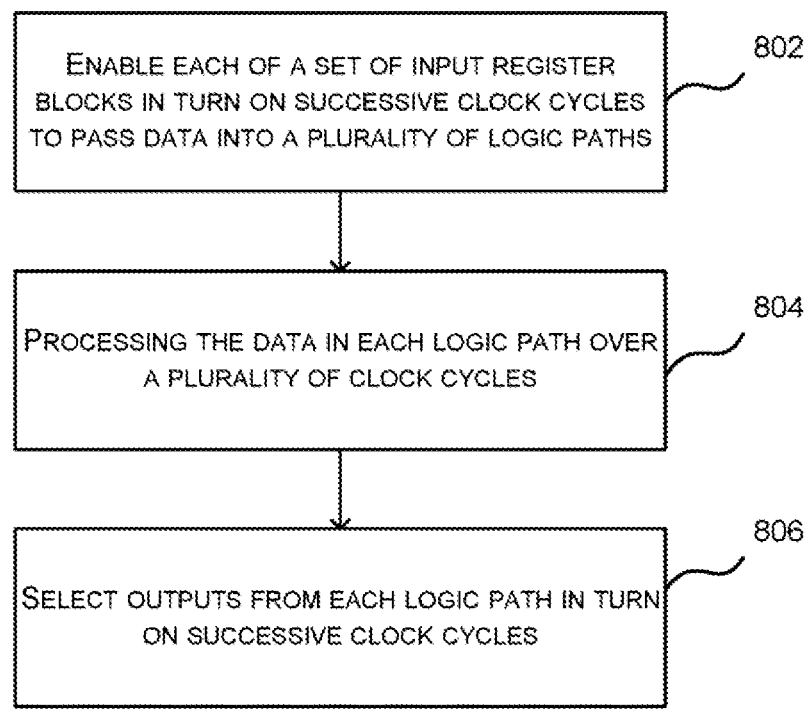
FIG. 8 is a flow diagram showing an example method of operation of a pipeline which uses sidelining.

FIG. 8 is a flow diagram showing an example method of operation of a pipeline which uses sidelining. As shown in FIG. 8 and described above with reference to the example improved pipelines, each of a set of input register blocks (which form an input register stage) are enabled in turn on successive clock cycles in order to pass data into a plurality of logic paths (block 802), where each logic path comprises the same arrangement of logic. The data which is passed into each logic path is then processed in each logic path over 2 or more clock cycles (block 804) and then an output from each of the plurality of logic paths is selected in turn on successive clock cycles (block 806), e.g. using a multiplexer. As described above, the output from a path which is selected (in block 806) may be an output from the logic within the path itself or an output from an output register stage.

Figure 9:
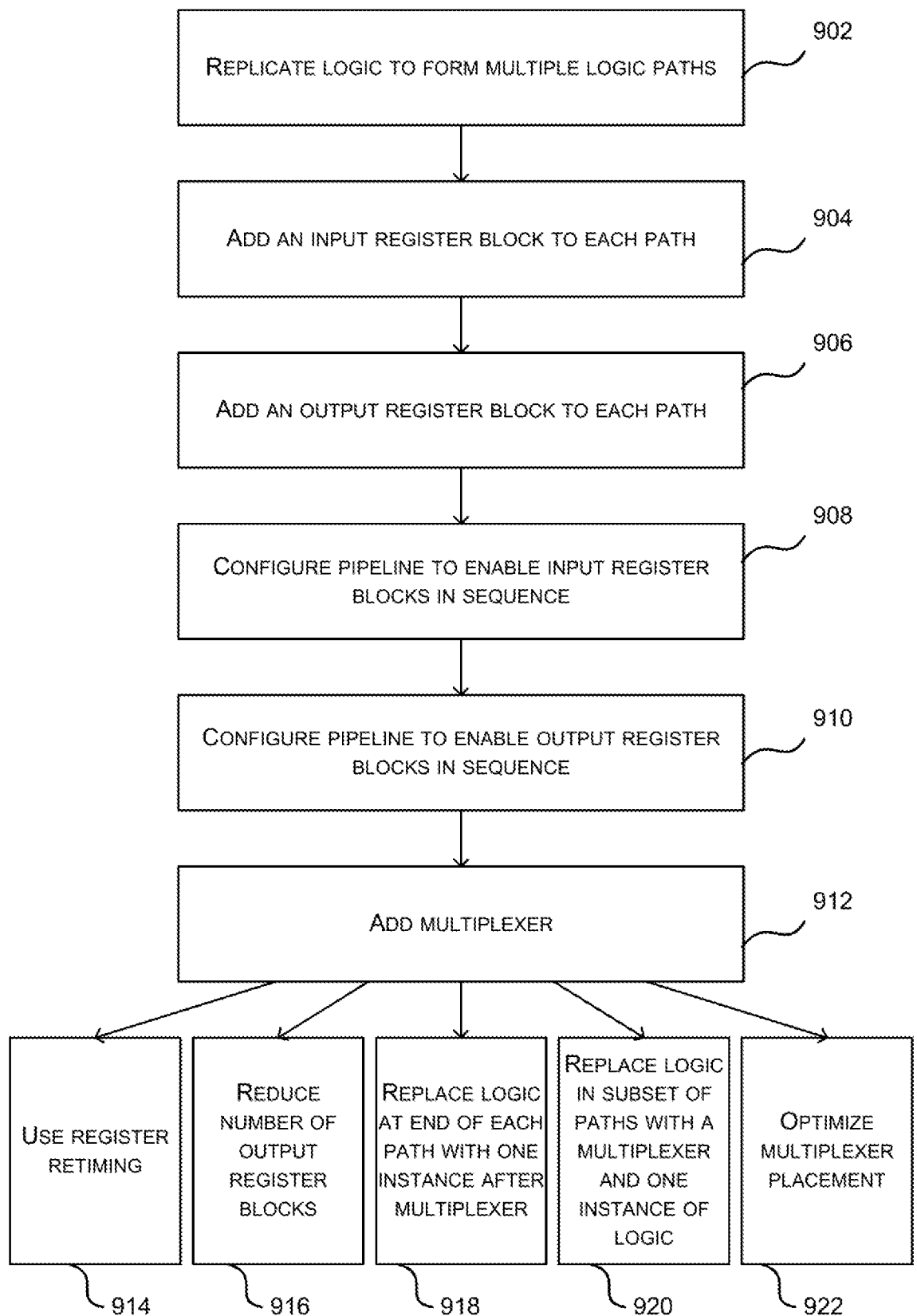
FIG. 9 is a flow diagram of an example method of designing an improved pipeline.

FIG. 9 is a flow diagram of an example method of designing an improved pipeline. As shown in FIG. 9 and described above with reference to the example improved pipelines, blocks of logic (which in many examples do not comprise any combinatorial feedback) within a pipeline are replicated to form multiple parallel logic paths (block 902). An input register block is added to the start of each logic path (block 904) and an output register block is added to the end of each logic path (block 906) and the pipeline configured such that the input register blocks are enabled sequentially, with one input register block being enabled on any clock cycle (block 908). Similarly the pipeline is further configured such that the output register blocks are enabled sequentially, with one output register block being enabled on any clock cycle (block 910). A multiplexer is then added to combine the outputs of the logic paths (block 912).

As described above, the method may further comprise one or more optimizations, such as one or more of:

- using traditional pipelining/register retiming within each logic path (block 914 and as shown in FIG. 6);
- replacing two or more output register blocks before the multiplexer with one output register block after the multiplexer (block 916 and as shown in FIG. 4);
- replacing a portion of the logic at the end of each logic path with a single instance of the portion of logic following the multiplexer and prior to the output register stage (block 918 and as shown in FIG. 5), where there is no overlap of when data needs to remain stable in each of the portions of logic in the separate logic paths;
- replacing a portion of the logic at the end of a (proper) subset of logic paths with a single instance of the portion of logic following a newly added multiplexer which combines the outputs of the subset of logic paths (block 920 and as shown in FIG. 7), where there is no overlap of when data needs to remain stable in the portions of logic in the subset of logic paths; and
- optimize multiplexer placement within the pipeline using known algorithms for register retiming (block 922).

As described above, by using the methods described herein a subset of the set up and hold time associated with the register stages in a pipeline are removed and so the clock speed can be increased, which increases the throughput of the pipeline. Furthermore, as described above, compared to conventional solutions, the dynamic power consumption can be reduced. There is some increase in the area of logic that is required however this is offset in part by a reduction in the area of registers that is required. Through use of the various optimizations described herein, it is possible to design a pipeline and trade off the increase in size against the increase in clock speed that can be achieved.

It will be appreciated that although FIGS. 2-7 are described above as showing a pipeline, they may alternatively show a part of a pipeline and the methods described herein may be applied to an entire pipeline or a part thereof.

In the examples described above, the replicated logic blocks (e.g. blocks 214 and 216 in FIG. 2) are described as being identical. It will be appreciated however, that there may be examples where there may be differences in the replicated logic (e.g. in a pipeline which has different types of operations passing in odd and even cycles).

The term 'processor' is used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

The methods described herein are not limited to CPUs, out-of-order processors or single threaded processors but may be implemented in any type of processor (e.g. a GPU), where the processor may or may not execute instructions out of order, and where the processor may be single or multi-threaded. Furthermore, as described above the methods described herein may be used outside of a processor.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

Any reference to a 'subset' refers to a proper subset such that the subset does not comprise one or more elements of the entire set.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A datapath pipeline comprising:
   one or more replicated blocks of logic forming parallel logic paths within the pipeline;
   an input register block at a start of each logic path, wherein input register blocks are enabled in sequence in successive clock cycles;
   a first multiplexer arranged to receive data directly from said replicated blocks of logic and recombine the parallel logic paths into a single output; and
   a single output register block connected to the output of the first multiplexer to receive data transmitted from the first multiplexer, wherein the single output register block is enabled on all clock cycles and receives data transmitted from the first multiplexer from the logic paths in sequence in the successive clock cycles.

2. The pipeline according to claim 1, wherein a replicated block of logic comprises hardware logic which takes more than one clock cycle to complete.

3. The pipeline according to claim 1, further comprising:
   a block of logic between the first multiplexer and an output register block.

4. The pipeline according to claim 1, further comprising:
   an intermediate multiplexer connected to a subset of the logic paths and arranged to combine the subset of the logic paths into a single output.

5. The pipeline according to claim 4, further comprising:
   a block of logic between the intermediate multiplexer and the first multiplexer.

6. The pipeline according to claim 1, wherein each logic path comprises a first block of logic and a second block of logic and an intermediate register stage between the first block of logic and the second block of logic.

7. The pipeline according to claim 1, comprising register stages at only an input and output of the pipeline.

8. The pipeline according to claim 1, wherein the pipeline is within a functional unit of a processor.

9. A method of operating a datapath pipeline, the method comprising:
   enabling each of a set of input register blocks in turn on successive clock cycles to pass data into a plurality of parallel logic paths;
   processing the data in each logic path over a plurality of clock cycles;
   using a multiplexer to select an output directly from each logic path in turn on successive clock cycles; and
   enabling a single output register block connected to an output of the multiplexer on all clock cycles to receive data transmitted from the multiplexer from the logic paths in turn on successive clock cycles.

10. A method according to claim 9, wherein the datapath pipeline is within a functional unit of a processor.

11. In a datapath pipeline having a plurality of parallel logic paths configured to process data from a plurality of input register blocks and a multiplexer configured to combine the plurality of parallel logic paths into a single path, the improvement comprising:
   providing only a single output register block for said datapath pipeline, said single output register block being connected to an output of the multiplexer to receive data transmitted from the multiplexer, wherein the single output register block is enabled on all clock cycles and receives data transmitted from the multiplexer from the logic paths in sequence in successive clock cycles.

* * * * *